United States Patent
Wynn et al.

(10) Patent No.: US 10,620,867 B2
(45) Date of Patent: Apr. 14, 2020

(54) SYSTEM AND METHOD FOR PERFORMING WEAR LEVELING AT A NON-VOLATILE FIRMWARE MEMORY

(71) Applicant: DELL PRODUCTS, LP, Round Rock, TX (US)

(72) Inventors: Allen Chester Wynn, Round Rock, TX (US); Frank Quintanilla, III, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/997,164

(22) Filed: Jun. 4, 2018

(65) Prior Publication Data

US 2019/0369898 A1 Dec. 5, 2019

(51) Int. Cl.
*G06F 3/06* (2006.01)

(52) U.S. Cl.
CPC .......... *G06F 3/0647* (2013.01); *G06F 3/0616* (2013.01); *G06F 3/0652* (2013.01); *G06F 3/0679* (2013.01)

(58) Field of Classification Search
CPC .... G06F 3/0679; G06F 3/0616; G06F 3/0652; G06F 3/0647

USPC .................................................. 711/103, 154
See application file for complete search history.

(56) References Cited

U.S. PATENT DOCUMENTS

| 9,110,787 | B2 | 8/2015 | Cornwell et al. |
| 9,262,336 | B2 | 2/2016 | Hyuseinova et al. |
| 9,830,098 | B1* | 11/2017 | Lin ........................ G11C 16/10 |
| 2012/0191927 | A1 | 6/2012 | Gorobets et al. |
| 2013/0339574 | A1 | 12/2013 | Franceschini et al. |
| 2014/0207998 | A1* | 7/2014 | Lu ........................ G06F 12/0246 711/103 |
| 2018/0095678 | A1* | 4/2018 | McClain .................. G06F 3/064 |

* cited by examiner

*Primary Examiner* — Hua J Song
(74) *Attorney, Agent, or Firm* — Larson Newman, LLP (57) ABSTRACT

A record is maintained of cumulative erase operations performed at each block of a firmware flash memory device. It is determined that a number of erase operations performed at a first block at the firmware flash memory device exceeds a first threshold value. It is further determined that a number of erase operations performed at a second block at the firmware flash memory device does not exceed a second threshold value. Data stored at the first block is relocated to the second block.

20 Claims, 10 Drawing Sheets

SYSTEM AND METHOD FOR PERFORMING WEAR LEVELING AT A NON-VOLATILE FIRMWARE MEMORY

FIELD OF THE DISCLOSURE

This disclosure generally relates to information handling systems, and more particularly relates to performing wear-leveling at a non-volatile firmware memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

A record may be maintained of cumulative erase operations performed at each block of a firmware flash memory device. It is determined that a number of erase operations performed at a first block at the firmware flash memory device exceeds a first threshold value. It is further determined that a number of erase operations performed at a second block at the firmware flash memory device does not exceed a second threshold value. Data stored at the first block is relocated to the second block.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

System firmware and other system variables are typically stored at a non-volatile random access memory (NVRAM) included at an information handling system. The NVRAM can be implemented using an electrically erasable flash memory device. In particular, a flash memory device can include a plurality of sectors, which represent the smallest unit of storage that can be erased in a single operation. For example, a sector may include four thousand bytes of data. When a sector is erased, all bits included in the sector are restored to a logic value representing a binary one. When data is subsequently stored at a sector, selected bits can be programmed to a logic value representing a binary zero. Additional writes to a particular addressable location are only possible if the data to be written requires transitioning further bit locations from a logic one to a logic zero. The only way to return a particular bit location to a logic one value is to erase the entire sector that includes the bit, returning all the bits in the sector to a logic one value. Memory bit cells of a flash memory device typically support only a limited number of erase operations, for example one hundred thousand erase operations.

The flash memory device included at an information handling system typically includes one or more logical partitions for storing firmware, and additional partitions for storing variables. While system firmware may be updated infrequently, partitions allocated for storing variables may be updated more frequently. Accordingly, sectors used to store particular variables may be erased more frequently than other sectors. In an embodiment, a record of erase operations can be maintained that identifies how many erase operations have been performed at individual regions of the firmware memory. While the record of erased operations can be maintained for individual sectors, it may be preferable to maintain the record of erase operations at a block level, a block representing a collection of sectors. FIGS. 1-10 illustrate techniques for monitoring and controlling automated relocation of firmware and variable partitions to increase the operating lifetime of the firmware memory.

Figure 1:
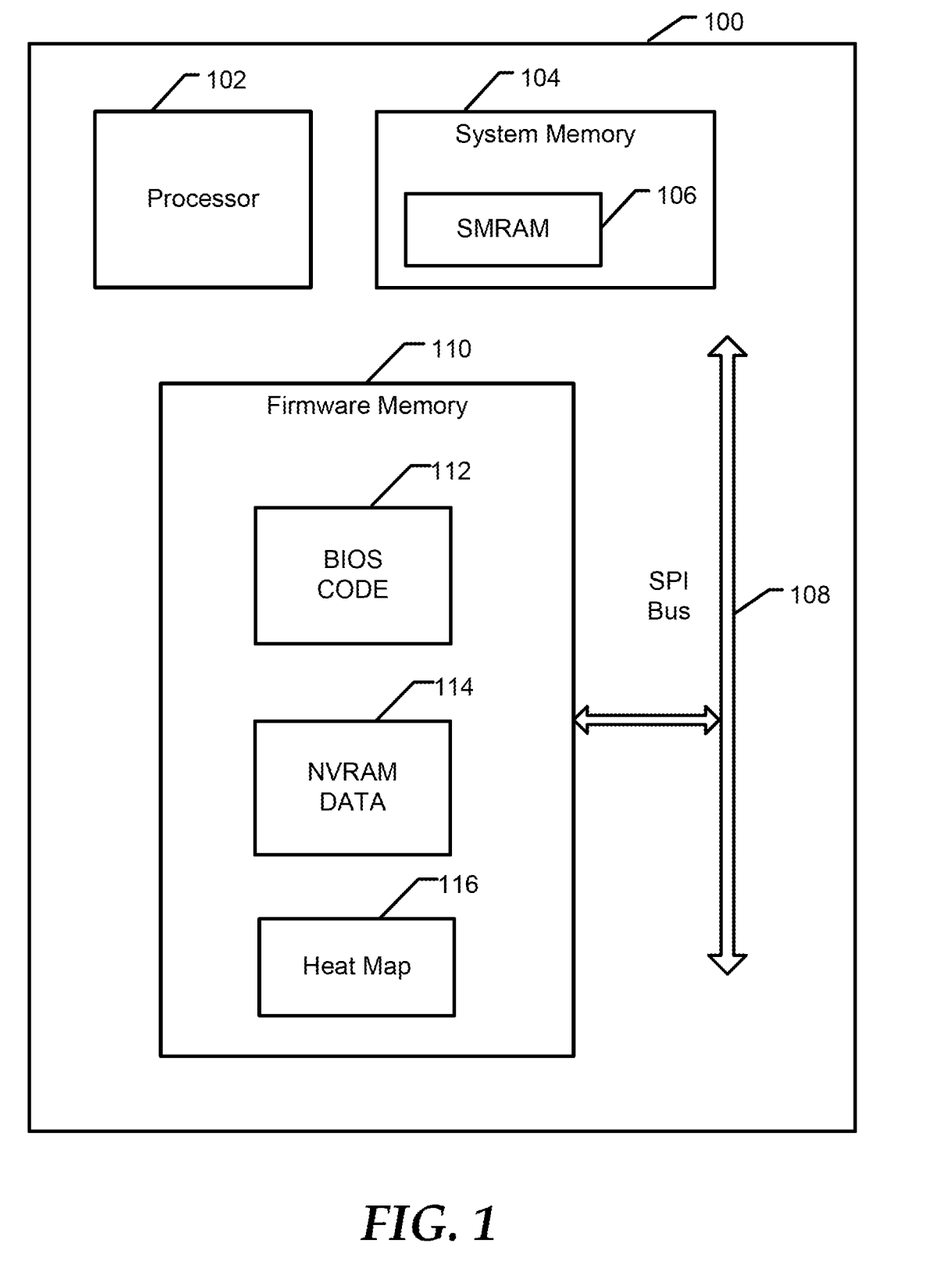
FIG. 1 is a block diagram illustrating an information handling according to a specific embodiment of the present disclosure.

FIG. 1 shows an information handling system 100 including a processor 102, system memory 104, a Serial Peripheral Interface (SPI) bus 108, and a firmware memory 110. System memory 104 includes a region allocated for use by system management software known as system management random access memory (SMRAM) 106. System 100 also includes a firmware memory 110. Firmware memory 110 is implemented using an NVRAM and can include one or more partitions for storing firmware code 112, and one or more partitions for storing NVRAM data 114. Firmware code 112 includes instructions that are executable by processor 110, while NVRAM data 114 includes environment variables and other system data. In an embodiment, firmware memory 110 can include a heat map 116 that identifies how many erase operations have been performed at individual blocks of firmware memory 110. SPI bus 108 is a synchronous serial data link providing communications with embedded systems, sensors, and SD cards, firmware memory 110, and the like. Firmware memory 110 is often referred to a SPI device, and accesses to the firmware memory 110 may be referred to as SPI read/write requests. While SPI bus 108 is illustrated at FIG. 1, another bus technology, such as an I2C bus, and the like, can be used to communicate with firmware memory 110 and other devices at system 100, such as a baseboard management controller (not shown at FIG. 1).

The information handling system can include additional hardware components and additional buses operable to transmit information between the various hardware components. For example, information handling system 100 can include one or more network interface controllers, peripheral component controllers and interconnects, video display controllers, and the like. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Firmware code 112 is historically referred to as a basic input/output system (BIOS), and the term BIOS is herein used interchangeably with the term firmware. Firmware code 112 is configured to initialize and test the hardware components of system 100, and to load a boot loader or an operating system (OS) from a mass storage device. Firmware code 112 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, firmware code 112 at information handling system 100 can be substantially compliant with one or more revisions of the Unified Extensible Firmware Interface (UEFI) specification. The UEFI specification replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system that utilizes a flash memory device to store firmware code and data.

The UEFI specification defines a set of runtime interfaces, serviced by the system BIOS, that allows drivers or an operating system (OS) to store and retrieve variables at NVRAM data 114. NVRAM data 114 can include additional partitions configured to store data that is proprietary to the original equipment manufacturer. The runtime interfaces can operate in conjunction with UEFI interface protocols, and corresponding handlers, to store and retrieve variables from firmware memory 110, and NVRAM data 114 in particular. NVRAM data 114 will persist across reboot of system 100. In addition, proprietary original equipment manufacturer (OEM) program code, similar to the UEFI get/set interfaces, can provide access to NVRAM data 114.

In an embodiment, all read and write accesses at firmware memory 110 are administrated by one or more device drivers included at firmware code 112. Access to NVRAM data 114 is typically administered in response to a software system management interrupt (SMI). A SMI causes processor 102 to transition to a system management mode (SMM). SMM is an operating mode in which all normal execution, including the OS is suspended, and special software is executed in a high-privilege mode. SMM typically supports power management, system hardware control, or proprietary OEM program code. SMM is intended for use only by system firmware, not by applications software or general purpose software. SMM provides an isolated processor environment that operates transparently to the OS and software applications. SMM can only be entered in response to an SMI, which can be either hardware or software generated. A software-generated SMI is typically initiated by a write access to a specific input/output (I/O) port or memory location. Current processor state must be saved at SMRAM 106 before the SMI can be serviced. System 100 includes software to process SMIs and to dispatch service to an appropriate handling routine based on the source of the interrupt.

In response to a request to write to NVRAM data 114 by a call to variable services, property services, and the like, the service/driver will first read the existing variable or property stored at NVRAM data 114 and compares it to the new value that is to be stored. If the present value stored at NVRAM data 114 is the same as the new value, the call simply returns a success indicator and no write operation is performed. If the present value stored at NVRAM data 114 is different then the new value, the driver checks to see if storing the new value can be accomplished by only changing bits presently at a logic one value to a logic zero value, and if so, the driver overwrites the existing variable or property. However, if the new data requires that particular bits transition from a logic zero to a logic one value, the driver clears a flag in the variable or property header to indicate that the variable/property has been deleted, and the driver writes a new variable/property at a new location. If there is insufficient space to complete a write operation, variables that are still valid are relocated to another sector, and the current sector is erased.

Figure 2:
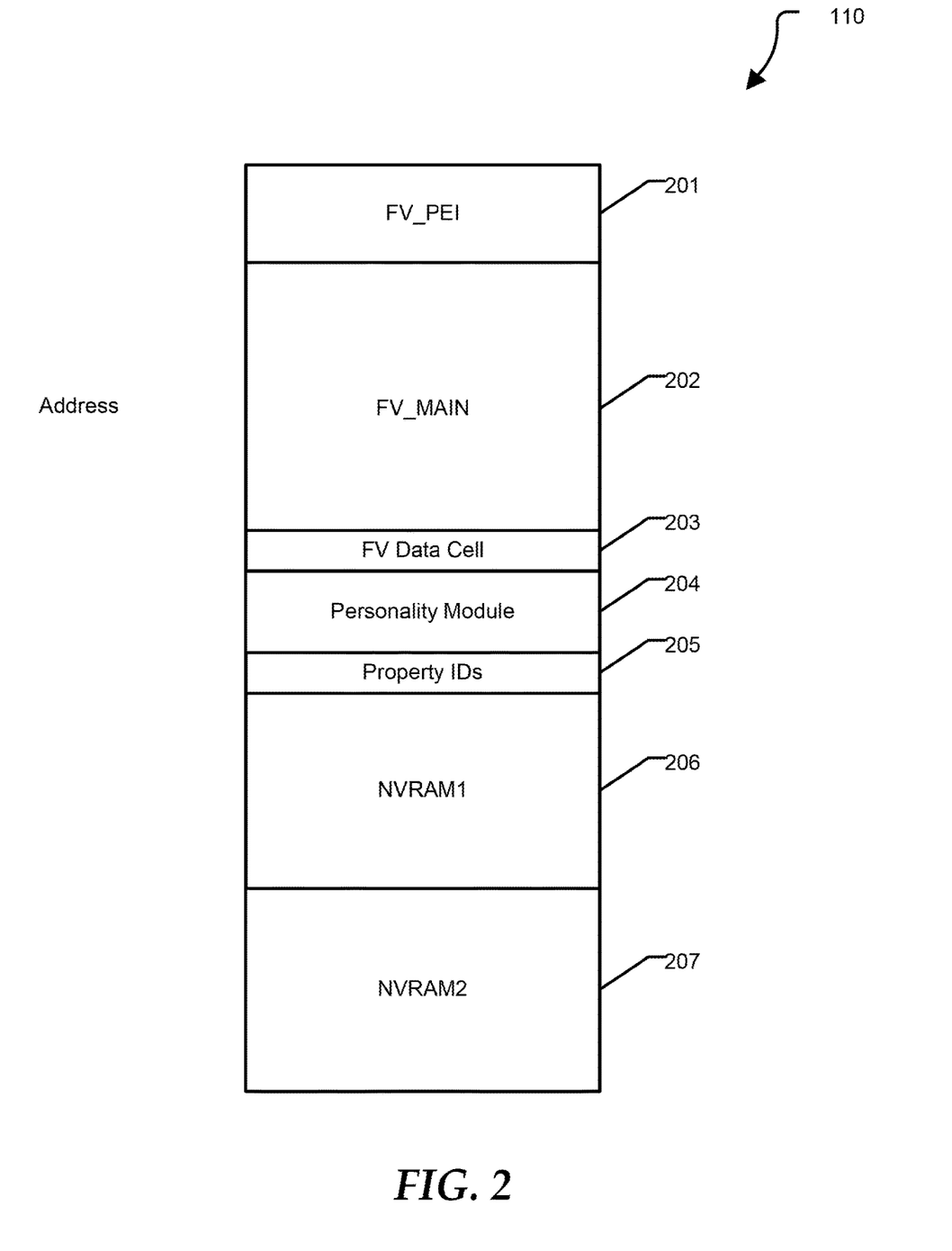
FIG. 2 is a block diagram illustrating logical partitions at a firmware memory according to a specific embodiment of the present disclosure.

FIG. 2 shows partitions at firmware memory 110 according to a specific embodiment of the present disclosure. Firmware memory 110 includes a partition 201 for storing firmware code associated with a pre-EFI initialization phase (PEI) of the Intel Platform Innovation Framework; and a partition 202 for storing firmware code associated with the remaining firmware. Firmware memory 110 further includes logical partition 203, 204, and 205 for storing OEM proprietary information, and logical partitions 206 and 207 configured to store data compliant with the UEFI specification, such as UEFI Authenticated Variables. For example partition 203 can be used to store a firmware update manifest, partition 204 can be used to store information associated with a user of information handling system 100, and partition 205 can be used to store additional operational settings, such as Secure Boot settings, setup properties, initialization dates, and the like. A logical partition can include more than one block. One of skill will appreciate that logical partitions 203, 204, and 205 are merely examples of variable and data storage partitions that an OEM may utilize. Fewer or additional partitions can be included. In an embodiment, partition 207 (NVRAM2) can be used to store a backup copy of data stored at partition 206 (NVRAM1).

During operation of information handling system 100, data associated with one or more partitions may be updated more frequently than data associated with other partitions. As described above, frequent updates to particular sectors of firmware memory 110 can result in the need for more frequent erase operations. In addition, excessive writes to firmware memory 110 can be caused by malicious code, such as a virus program. Excessive writes to firmware memory 110 also may be caused by legitimate program code that inadvertently includes an error. For simplicity and clarity, the present disclosure will refer to blocks of firmware memory that have experienced a greater number of erase operations relative to other blocks as 'hot', while blocks of firmware memory that have experience a fewer number of sector erase operations relative to other blocks as 'cold'. For example, a block may include sixty-four thousand bytes of storage. In a particular embodiment, erase operations at firmware memory 110 can be performed at a block level, wherein all sectors included at a block are erased in a single operation. As disclosed herein, a user can specify a threshold that can be used to quantify the hotness of a particular block of firmware memory relative to other blocks. In an embodiment, this threshold can be user-programmable via one or more options included at a BIOS configuration interface that can be displayed during initialization of information handling system 100. In an embodiment, the BIOS configuration interface can include a graphical or text-based representation of the hotness of individual blocks of firmware memory 110.

For simplicity, this representation may be referred to as a heat map or an odometer because it provides a record of cumulative sector erase operations associated with each block of firmware memory. The heat map can identify individual sectors of firmware memory 110, but may instead aggregate a number of contiguous sectors into blocks. The heat map can be stored at firmware memory 110, for example at heat map 116 of FIG. 1, or the heat map can be stored at another location, such as at a memory device included at an embedded controller included at information handling system 100, or at another memory device accessible to system 100. During operation of information handling system 100, data stored at a block that has been declared as hot, or data included in logical partitions that span blocks that have been declared as hot, can be automatically relocated to regions of firmware memory 110 that include blocks that are declared as cold, or relatively cooler. Accordingly, wear to the flash memory bit cells caused by sector or block erase operations can be better balanced across the available bit cells at firmware memory 110.

Figure 3:
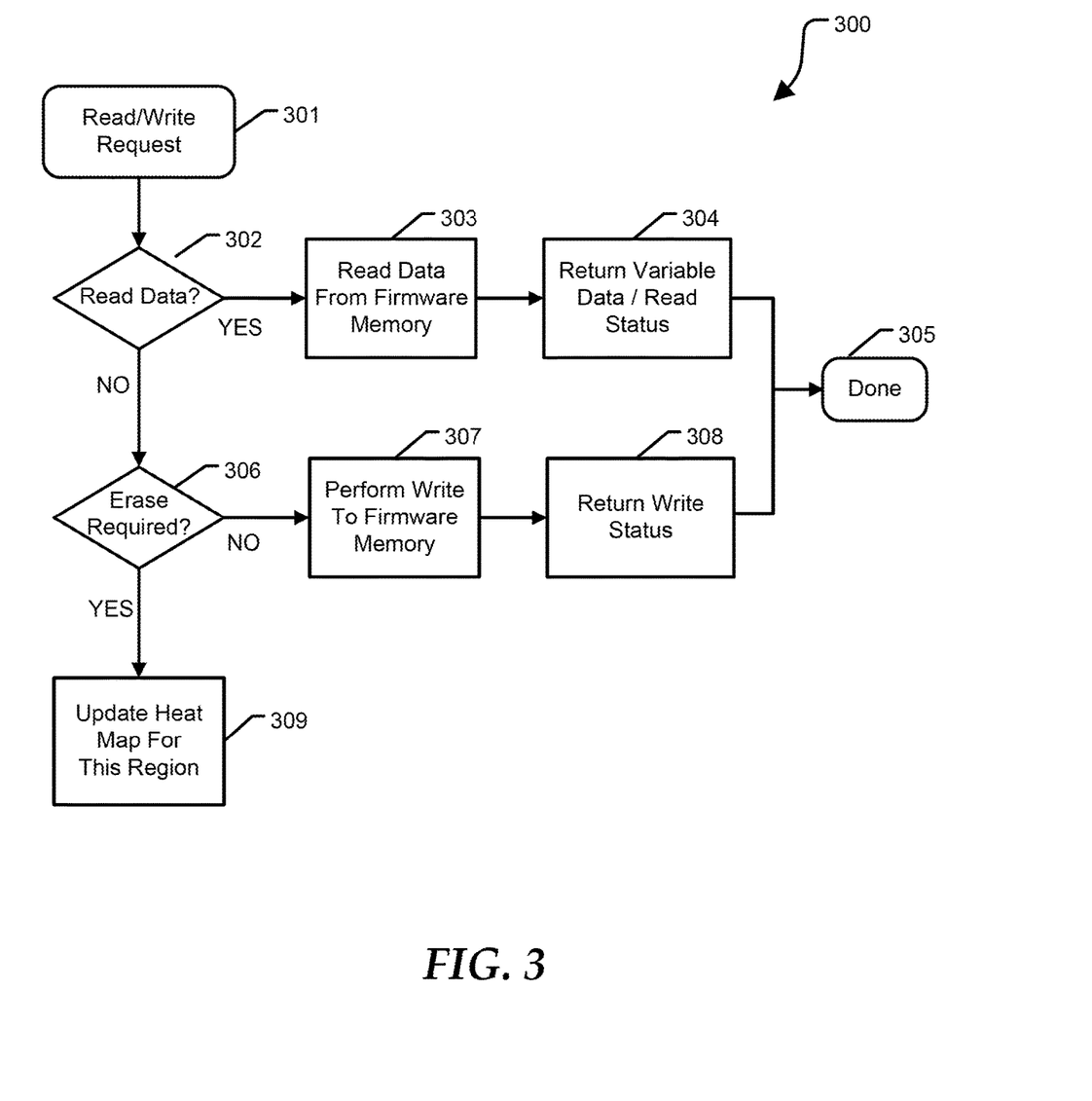
FIG. 3 is a flow diagram illustrating a method for maintaining a record of erase operations performed at an NVRAM firmware memory device according to a specific embodiment of the present disclosure.

FIG. 3 shows a method 300 for maintaining a record of erase operations performed at an NVRAM firmware memory device according to a specific embodiment of the present disclosure. Method 300 begins at block 301 where a request to read or write to a firmware memory is identified. For example, a software process or application can issue a request to access firmware memory 110. The access can be administrated by a device driver. In an embodiment, method 300 can be implemented in part or in full by the device driver. At decision block 302, it is determined whether the access request is to read data from firmware memory 110. If the request is a read request, method 300 proceeds to block 303 where the requested data is accessed from firmware memory 110. At block 304, the requested data is provided to the process that issued the access request, and the access completes at block 305.

Returning to decision block 302, if the access request is to write to firmware memory 110, method 300 proceeds to decision block 306 where it is determined whether an erase operation is required in order to complete the write request. If an erase operation is not required, the method continues at block 307 where the write operation is completed by storing data associated with the request at firmware memory 110. At block 308, write status is returned to the process that issued the access request, and the access completes at block 305. Returning to decision block 306, if an erase operation is required, a heat map, such as heat map 116 can be updated to identify an accumulated number of sector erase operations that have been performed at each sectors of firmware memory 110.

Figure 4:
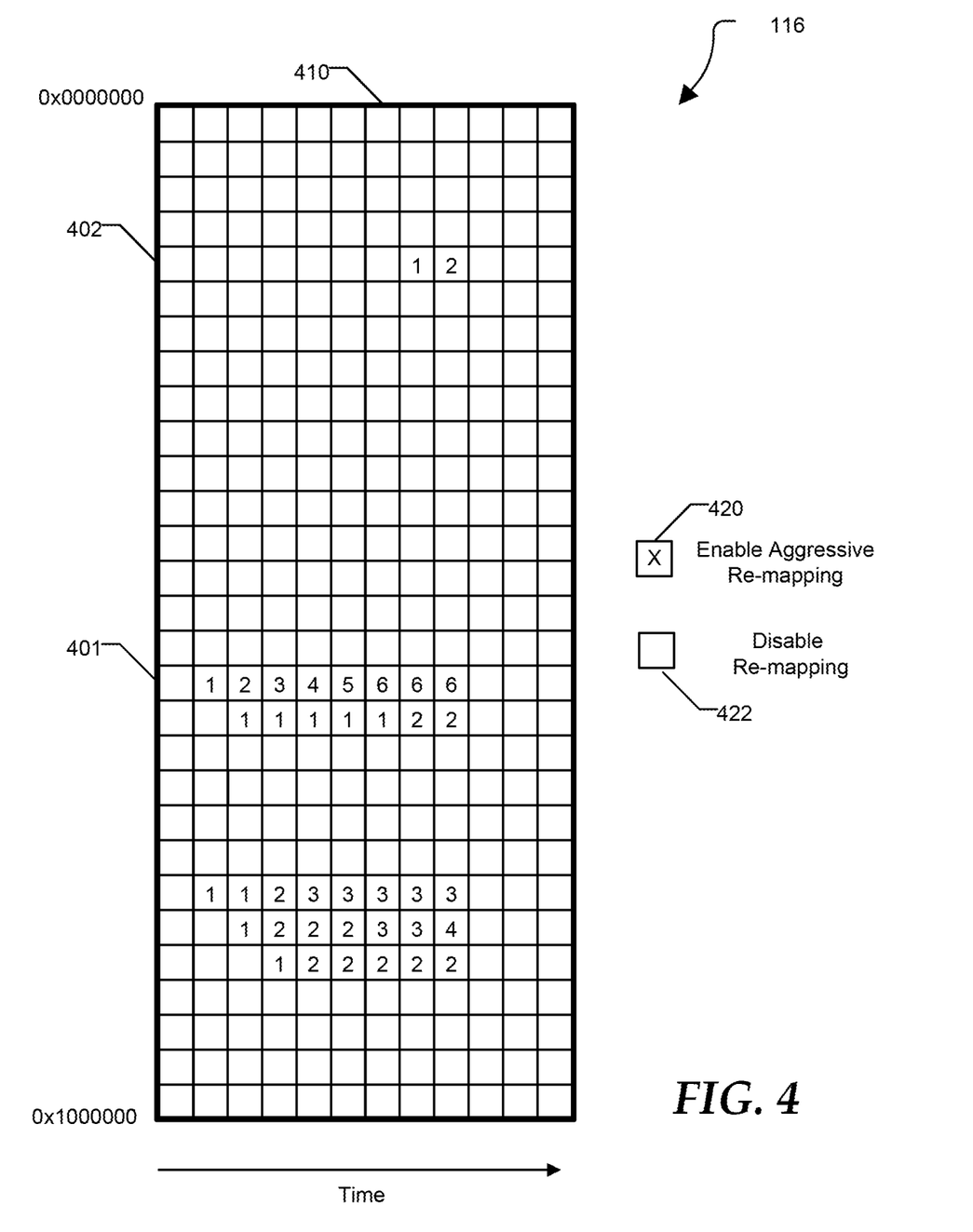
FIG. 4 is a graphical representation of a heat map displayed at a BIOS configuration interface according to a specific embodiment of the present disclosure.

FIG. 4 shows a heat map 116 that can be displayed at a BIOS configuration interface according to a specific embodiment of the present disclosure. Heat map 116 includes a vertical axis representing a range of addressable memory cells at firmware memory 110, and a horizontal axis representing time. For example, heat map 116 can indicate a cumulative number of block-level erase operations performed at each of a plurality of address blocks included at firmware memory 110. For example, the numerals included at particular cells of heat map 116 can indicate a number of block-level erase operations have been performed at corresponding blocks of memory 110. If individual sectors are erased, the numeral included at a cell of heat map 116 indicates the number of erase operations performed at a most-erased sector of a corresponding block. For convenience, the number of erased operations can be expressed in increments of one thousand. For example, a value of one can represent one thousand sector erase operations. For example, row 401 of heat map 116 can represent a block of firmware memory 110 that includes a sixty-four thousand byte range of addresses. Alternatively, the relative hotness of blocks can be represented using a range of colors, for example green representing relatively cool blocks, graduating up to red representing a significantly large number of erasures relative to other blocks. Other graphical representations can be utilized to illustrate the relative hotness of blocks included at firmware memory 110, for example a three-dimensional topological map.

The individual cells of row 401 can represent months of operation of information handling system 100. Accordingly, row 401 of heat map 116 can illustrate that a sector included in this block was erased one thousand time in one month, an additional thousand times during each of several following months. At column 410, the number of erase operations of the block at row 401 is seen to stop increasing. This can be the result of relocating the logical partition associated with this highly accessed block to another physical location within firmware memory 110, such as the block corresponding to row 402. As illustrated at row 402, the logical partition previously stored at the block corresponding to row 401 and now stored at the block associated with row 402 continues to experience a relatively high rate of erasure, as indicated by two consecutive months having one thousand erase operations. The BIOS configuration interface can include a user-selectable option 420 specifying how aggressively logical partitions should be relocated, an option 422 specifying whether relocation is enabled, and the like. One of skill will appreciate that heat map 116 can be represented in many different ways. For example, the number and corresponding address size of each block of heat map 116 can vary. In an embodiment (not shown at FIG. 4), the numerical entry at a particular row and column can indicate a heat of a block relative to colder blocks, rather than an absolute number of cumulative erase operations.

Figure 5:
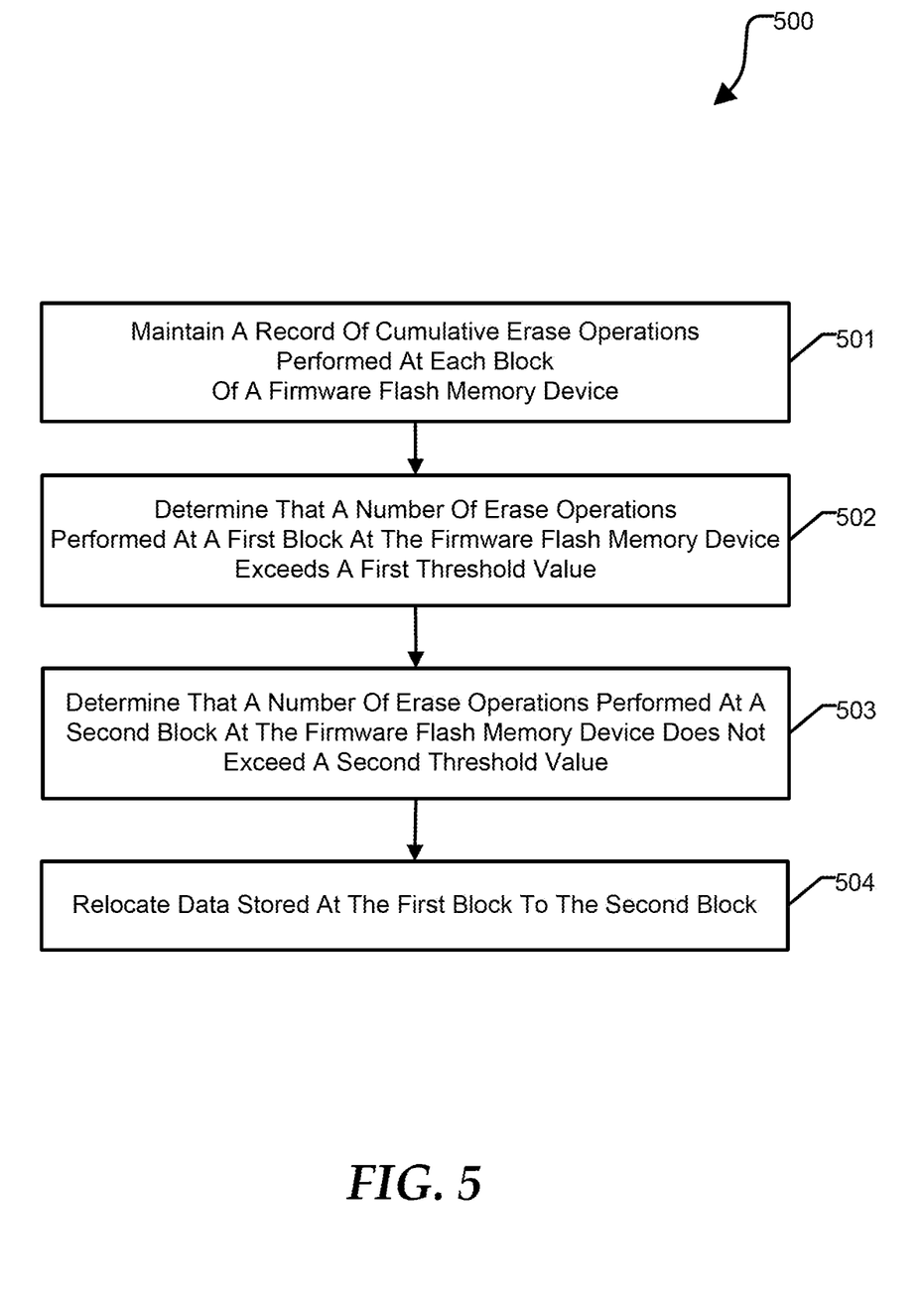
FIG. 5 is a flow diagram illustrating a method for relocating data at firmware memory according to a specific embodiment of the present disclosure

FIG. 5 shows a method 500 for relocating data at firmware memory 110 according to a specific embodiment of the present disclosure. Method 500 begins at block 501 where a record is maintained of cumulative erase operations performed at each block of a firmware flash memory device. For example, method 300 described above illustrates updating a heat map when a write operation to firmware memory 110 requires an erase operation. Method 500 continues at block 502 where it is determined that a number of erase operations performed at a first block at the firmware flash memory device exceeds a first threshold value. Method 500 continues at block 503 where is determined that a number of erase operations performed at a second block at firmware flash memory device does not exceed a second threshold value. As described above, a block can be considered hot or cold relative to other blocks. Accordingly, the first and second thresholds described above can be updated continuously or periodically. Method 500 completes at block 504 where data stored at the first block is relocated to the second block. Data included at a logical partition may span more than one block. Accordingly, a logical partition that includes at least one hot block is typically relocated in its entirety.

Figure 6:
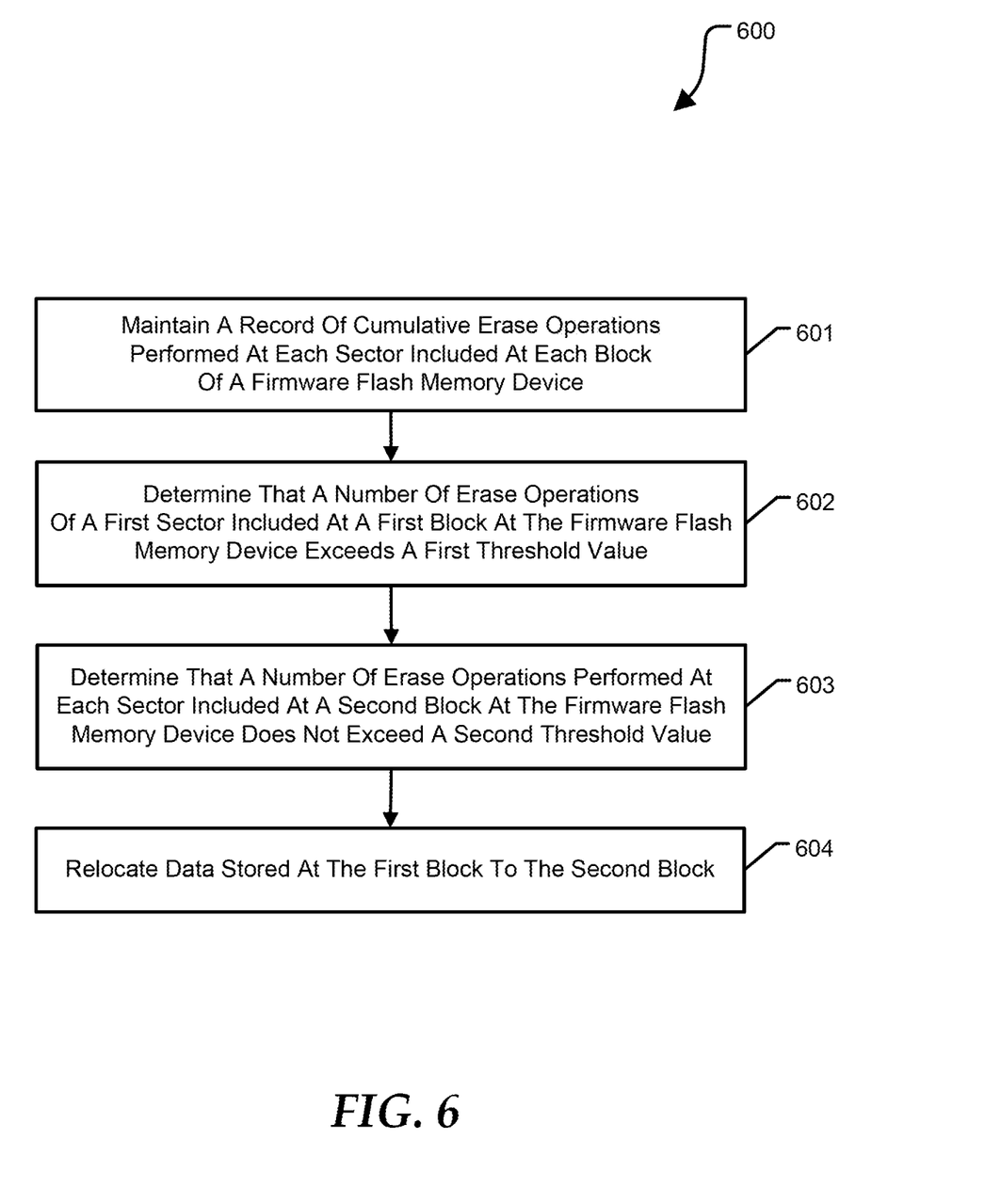
FIG. 6 is a flow diagram illustrating a method for relocating data at firmware memory according to another embodiment of the present disclosure.

FIG. 6 shows a method 600 for relocating data at firmware memory 110 according to another embodiment of the present disclosure. Method 600 begins at block 601 where a record is maintained of cumulative erase operations performed at each sector included at each block of a firmware flash memory device. For example, method 300 described above illustrates updating a heat map when a write operation to firmware memory 110 requires an erase operation. Method 600 continues at block 602 where it is determined that a number of erase operations of a first sector included at a first block at the firmware flash memory device exceeds a first threshold value. In an embodiment a record of erase operations at each of a plurality of sectors included in a block is maintained. Heat map 116 associates the number of erase operations at the most-erased sector of this collection of sectors with the corresponding block. Method 600 continues at block 603 where is determined that a number of erase operations performed at each sector included at a second block at firmware flash memory device does not exceed a second threshold value. For example, in order for a block to be considered cool, all sectors included in the block must be cool. As described above, a block can be considered hot or cold relative to other blocks. Accordingly, the first and second thresholds described above can be updated continuously or periodically. Method 600 completes at block 604 where data stored at the first block is relocated to the second block. In an embodiment, data stored at the second block can be relocated to the first block. FIGS. 7-10 provide examples of possible block relocation techniques.

Figure 7:
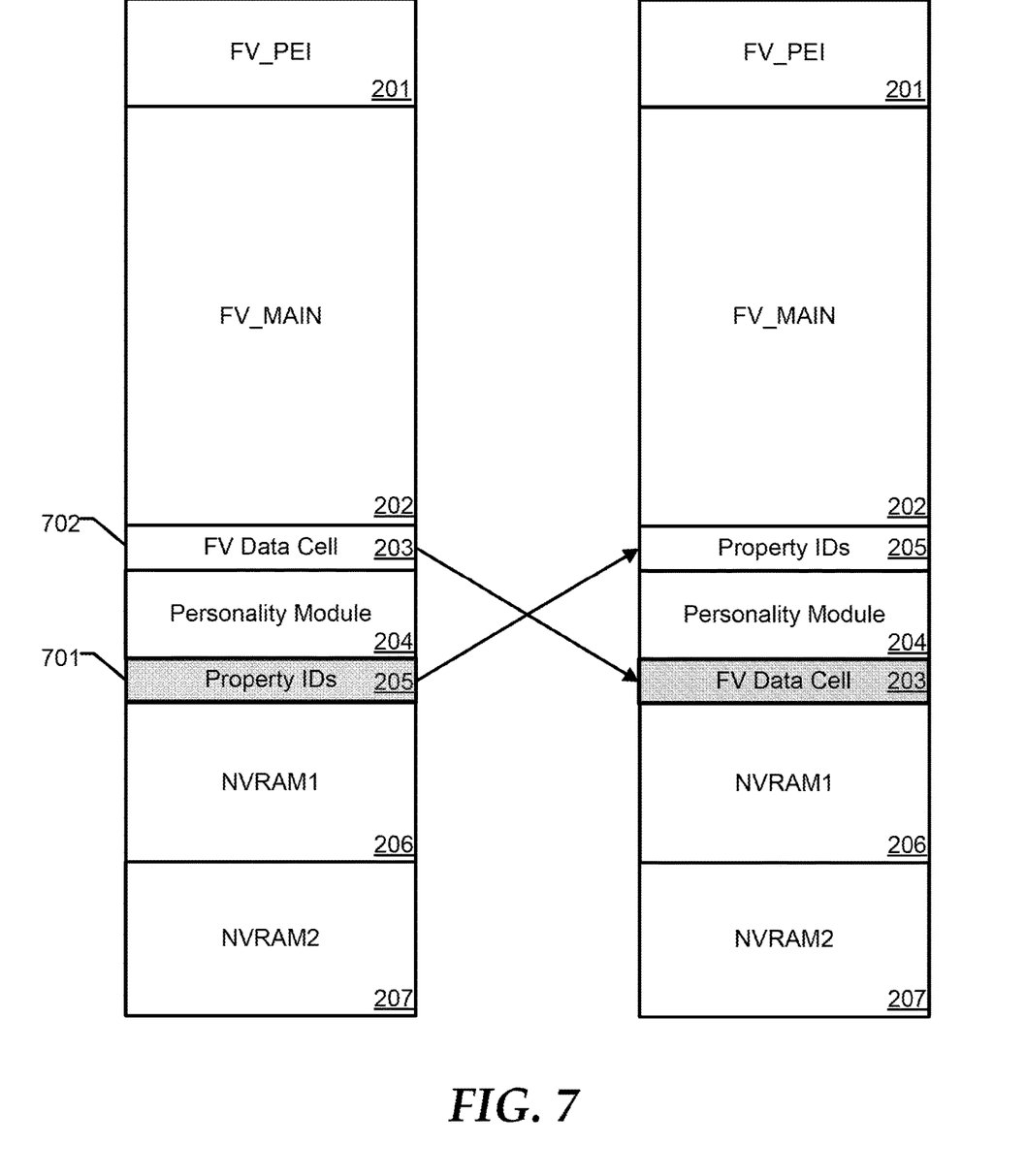
FIG. 7 is a diagram illustrating relocation of data at a firmware memory according to a specific embodiment of the present disclosure.

FIG. 7 shows relocating data presently stored at one region of firmware memory 110 to another region according to a specific embodiment of the present disclosure. In particular, FIG. 7 illustrates firmware memory 110 before relocating data (left side) and after relocating data (right side). In this example, a region of firmware memory 110 identified by reference 701 (shaded region) has been determine to be hot compared to the region identified by reference 702. For example, during operation of information handling system 100, variables associated with Property IDs 205 have been updated and erased more frequently than variables corresponding to FV Data Cell 203. In this example, the size of partitions 205 and 203 are same. By swapping the storage locations of these two logical partitions, it can be expected that the region corresponding to partition 205 will subsequently receive fewer erase operations going forward. Similarly, it can be expected that variables associated with Property IDs 205 will continue to be updated more frequently. Consequently, the region associated with partition 702 is likely to experience an increase in sector erase operations. Accordingly, the lifetime of firmware memory 110 can be extended because erase operations have been better balanced across sectors included in the regions corresponding to partitions 701 and 702.

Figure 8:
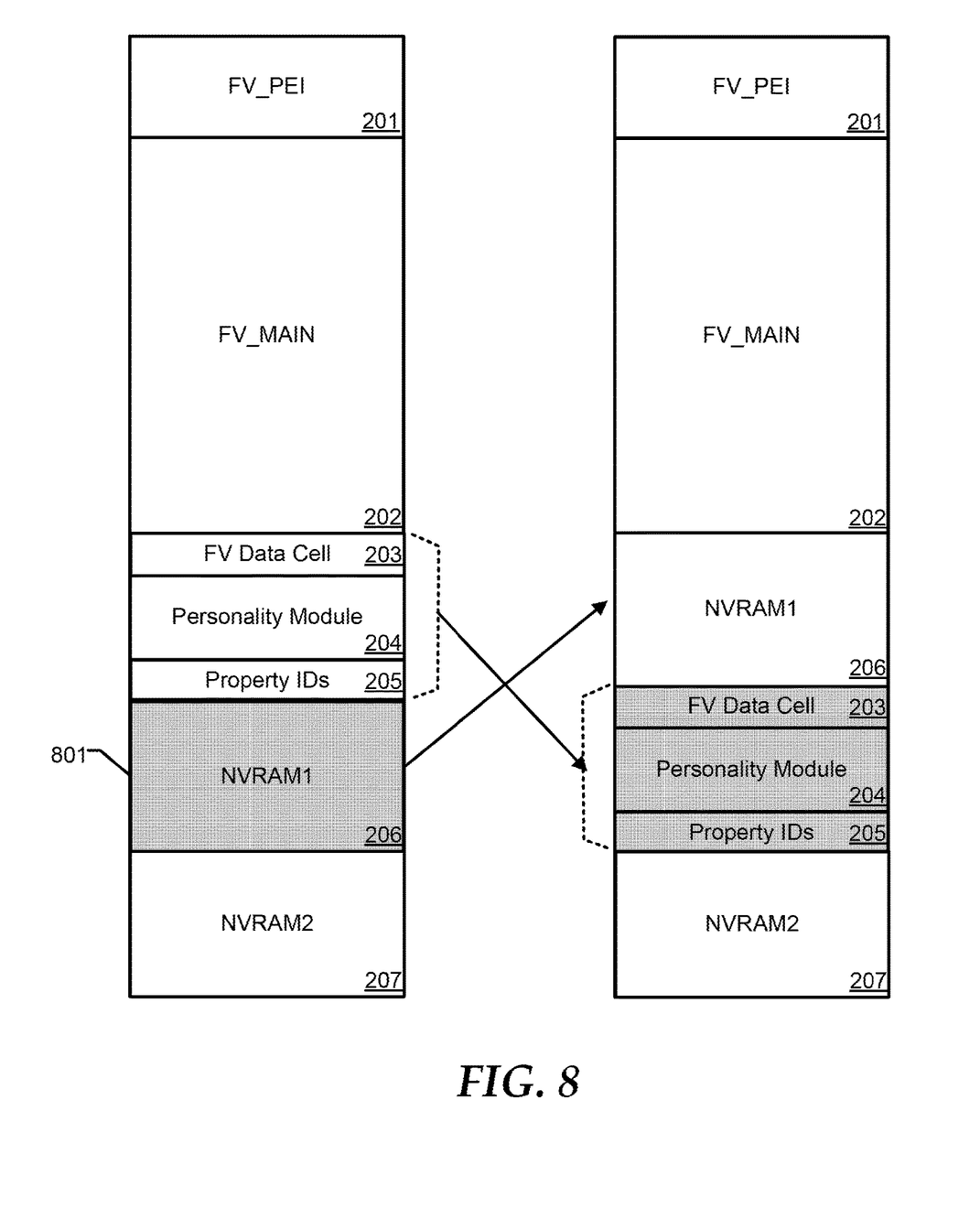
FIG. 8 is a diagram illustrating relocation of data at a firmware memory according to another embodiment of the present disclosure.

FIG. 8 shows relocating data presently stored at one region of firmware memory 110 to another region according to another embodiment of the present disclosure. At a particular time during the lifetime of information handling system, heat map 116 indicates that region 801 of firmware memory 110 corresponding to the NVRAM1 partition 206 is hot relative to other regions because system 100 has performed more accesses and corresponding erase operations at sectors included in partition 206 relative to other regions, at least during the most recent history of operation. One of skill will appreciate that previous instances of data relocation may have taken place and regions considered hot, relative to other regions, can change over time as a result of previous movement of data. In this example, it is determined that the combined size of partitions 203, 204, and 205 is equal to the size of partition 206. Therefore it is possible to swap the physical storage locations of these partitions as indicated by the arrows.

Figure 9:
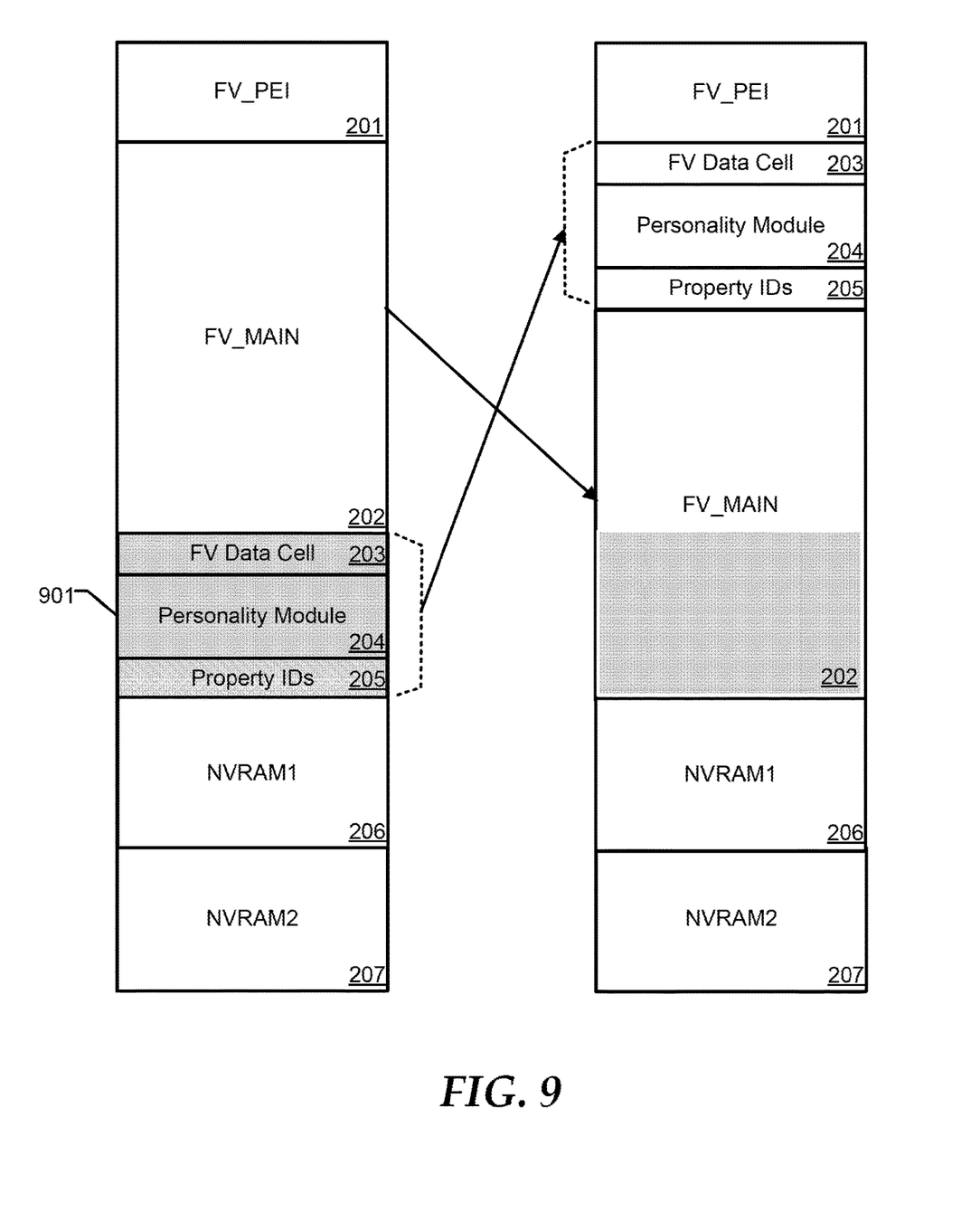
FIG. 9 is a diagram illustrating relocation of data at a firmware memory according to yet another embodiment of the present disclosure.

FIG. 9 shows relocating data presently stored at one region of firmware memory 110 to another region according to yet another embodiment of the present disclosure. FIG. 9 illustrates a situation in time when a region identified by reference 901 is determined to be hot relative to another region. In particular, logical partitions that contains firmware code, as compared to variable storage, typically remains relatively cold, because firmware instructions are updated infrequently. Accordingly a region that containing instructions can be shifted by an amount corresponding to the size the hot regions 901. In this example, partition 202 corresponding to FV_MAIN has been shifted so that data stored at region 901 can be relocated to the region made available by the shift, as indicated by the arrows. In an embodiment, partition 201 corresponding to FV_PEI may not be relocatable due to architectural limitations.

Figure 10:
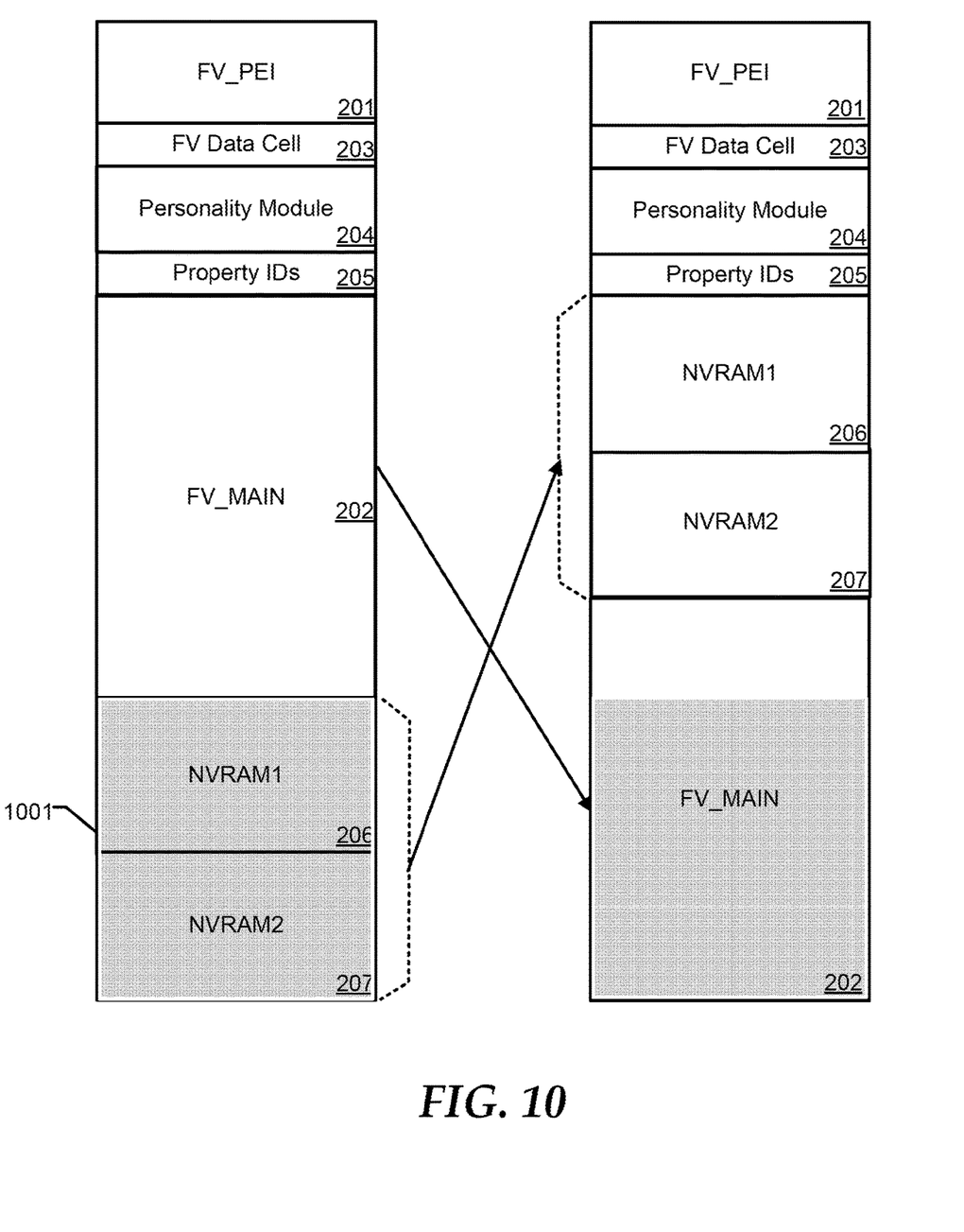
FIG. 10 is a diagram illustrating relocation of data at a firmware memory according to still another embodiment of the present disclosure.

FIG. 10 shows relocating data presently stored at one region of firmware memory 110 to another region according to still another embodiment of the present disclosure. In particular, FIG. 10 illustrates a further relocation procedure subsequent to that illustrated at FIG. 9. At a particular point of time, heat map 116 indicates that region 1001 corresponding to partitions 206 and 207 have become hot relative to other regions. In order to provide improved wear leveling, region 202 corresponding to FV_Main is once again shifted by an amount corresponding to the size of the combined region 1001.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
maintaining a record of cumulative erase operations performed at each block of a firmware flash memory device;
determining that a number of erase operations performed at a first block at the firmware flash memory device exceeds a first threshold value;
determining that a number of erase operations performed at a second block at the firmware flash memory device does not exceed a second threshold value;
relocating data stored at the first block to the second block;
in response to determining that a request to access data at the firmware flash memory device is a write access to the first block that does not require performing an erase operation at the first block, storing data associated with the request at the first block; and
in response to determining that the request is a write access that does require performing the erase operation at the first block, incrementing a counter associated with the first block.

2. The method of claim 1, wherein the maintaining, determining, and relocating is performed by a device driver responsible for accessing the firmware flash memory device.

3. The method of claim 1, further comprising:
providing at a basic input/output system (BIOS) configuration interface a representation of each block at the firmware memory, a representation of the first block indicating the number of erase operations performed at the first block relative to other blocks.

4. The method of claim 3, wherein the BIOS configuration interface includes a configuration option specifying the first threshold.

5. The method of claim 1, further comprising generating a record at an event log identifying the relocating of data stored at the first and second blocks.

6. The method of claim 1, further comprising generating a record at an event log identifying the number of erase operations of the first block exceeds a third threshold value.

7. The method of claim 1, further comprising:
in response to determining that the request is a read access, retrieving the requested data from the firmware flash memory device.

8. A method comprising:
maintaining a record of cumulative erase operations performed at each sector included at each block of a firmware flash memory device;
determining that a number of erase operations of a first sector included at a first block at the firmware flash memory device exceeds a first threshold value;
determining that a number of erase operations performed at each sector included at a second block at the firmware flash memory device does not exceed a second threshold value;
relocating data stored at the first block to the second block;
in response to determining that a request to access data at the firmware flash memory device is a write access to the first sector that does not require performing an erase operation at the first sector, storing data associated with the request at the first sector; and
in response to determining that the request is a write access that does require performing the erase operation at the first sector, incrementing a counter associated with the first sector.

9. The method of claim 8, wherein the maintaining, determining, and relocating is performed by a device driver responsible for accessing the firmware flash memory device.

10. The method of claim 8, further comprising:
determining that a first count of erase operations performed at the first sector exceeds a number of erase operations performed at other sectors included in the first block; and
associating the first count with the first block.

11. The method of claim 10, further comprising:
providing at a basic input/output system (BIOS) configuration interface a representation of each block at the firmware memory, a representation of the first block indicating a number of erase operations performed at the first block relative to other blocks.

12. The method of claim 11, wherein the BIOS configuration interface includes a configuration option specifying the first threshold.

13. The method of claim 8, further comprising generating a record at an event log identifying the relocating of data stored at the first and second blocks.

14. The method of claim 8, further comprising:
in response to determining that the request is a read access, retrieving the requested data from the firmware flash memory device.

15. An information handling system comprising:
a non-volatile random access memory (NVRAM) to store basic input/output system firmware and to store data;
a driver configured to provide access to the NVRAM, the driver to:
maintain a record of cumulative erase operations performed at each block of a firmware flash memory device;
determine that a number of erase operations performed at a first block at the firmware flash memory device exceeds a first threshold value;
determine that a number of erase operations performed at a second block at the firmware flash memory device does not exceed a second threshold value;
relocate data stored at the first block to the second block;
in response to determining that a request to access data at the firmware flash memory device is a write access at the first block that does not require performing an erase operation at the first block, storing data associated with the request at the first block; and
in response to determining that the request is a write access that does require performing the erase operation at the first block, incrementing a counter associated with the first block.

16. The information handling system of claim 15, further comprising a basic input/output system (BIOS) configuration interface including a representation of each block at the firmware memory, a representation of the first block indicating the number of erase operations performed at the first block relative to other blocks.

17. The information handling system of claim 15, wherein the BIOS configuration interface includes a configuration option specifying the first threshold.

18. The information handling system of claim 15, wherein the driver is further configured to generate a record at an event log identifying the relocating of data stored at the first and second blocks.

19. The information handling system of claim 15, further comprising generating a record at an event log identifying the number of erase operations performed at the first block exceeds a third threshold value.

20. The information handling system of claim 15, further comprising:
   in response to determining that the request is a read access, the driver is to retrieve the requested data from the firmware flash memory device.

\* \* \* \* \*